(No Model.) 3 Sheets—Sheet 1.

O. W. ALLISON.
CIGARETTE MACHINE.

No. 290,166. Patented Dec. 11, 1883.

WITNESSES:
H. G. Phillips.
J. F. Gordon.

INVENTOR:
Oscar W. Allison,
by Geo. B. Selden,
Atty.

N. PETERS. Photo-Lithographer, Washington, D. C.

(No Model.)   O. W. ALLISON.   3 Sheets—Sheet 2.
CIGARETTE MACHINE.
No. 290,166.   Patented Dec. 11, 1883.
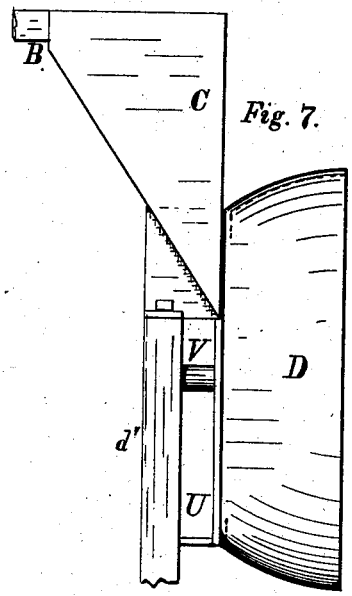
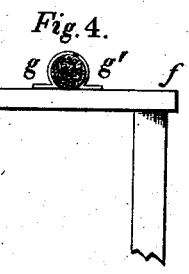
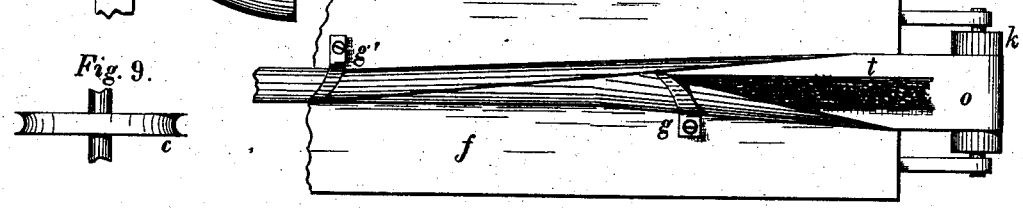
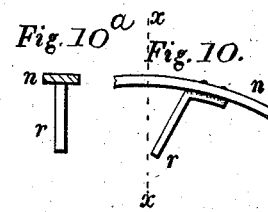
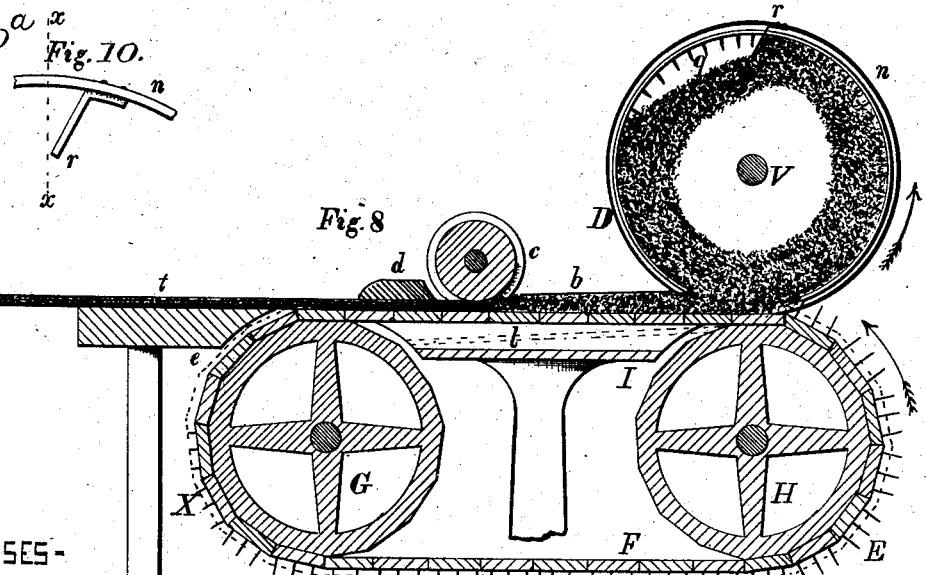
WITNESSES—
H. G. Phillips.
J. F. Gordon.
INVENTOR—
Oscar W. Allison,
by Geo. B. Selden,
atty.

(No Model.)
O. W. ALLISON.
CIGARETTE MACHINE.
No. 290,166. Patented Dec. 11, 1883.
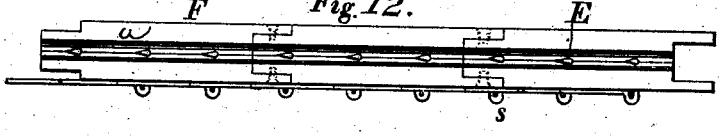
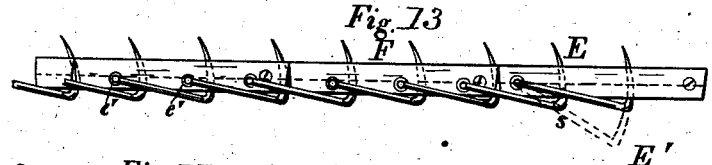
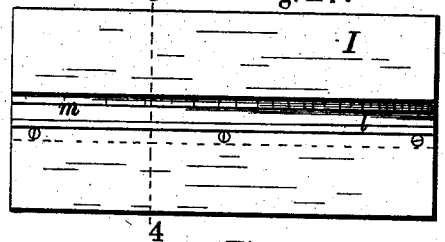
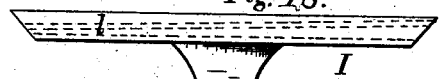
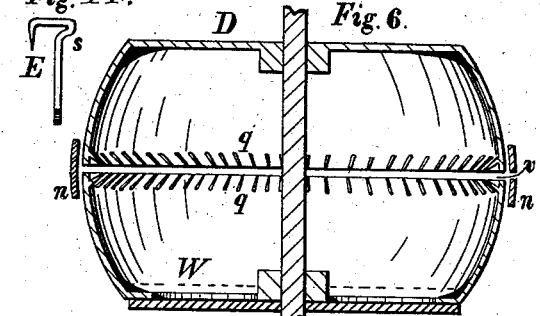
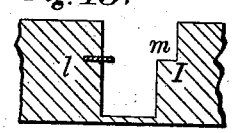
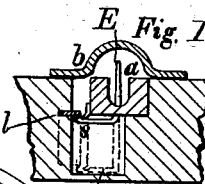
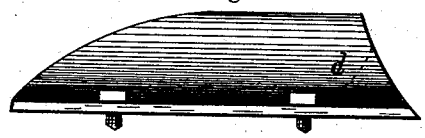
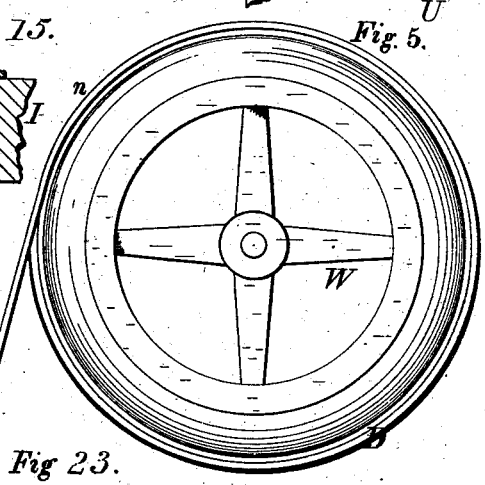
WITNESSES=
H. G. Phillips.
J. F. Gordon.
INVENTOR=
Oscar W. Allison.
by Geo. B. Selden
Atty.

United States Patent Office.

OSCAR W. ALLISON, OF ROCHESTER, NEW YORK, ASSIGNOR, BY DIRECT AND MESNE ASSIGNMENTS, TO ALLISON BROTHERS COMPANY, OF SAME PLACE.

CIGARETTE-MACHINE.

SPECIFICATION forming part of Letters Patent No. 290,166, dated December 11, 1883.

Application filed March 4, 1882. (No model.)

*To all whom it may concern:*

Be it known that I, OSCAR W. ALLISON, a citizen of the United States, residing at Rochester, in the county of Monroe and State of New York, have invented certain new and useful Improvements in Cigarette-Machines, of which the following is a specification, reference being had to the accompanying drawings.

My invention relates to certain improvements in cigarette-machines, which improvements are hereinafter fully described, and the novel features thereof specified in the claims hereto annexed.

Figure 1:
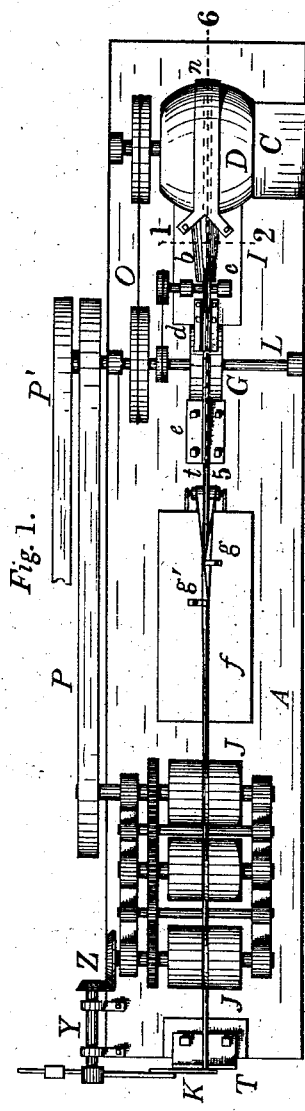
Figure 2:
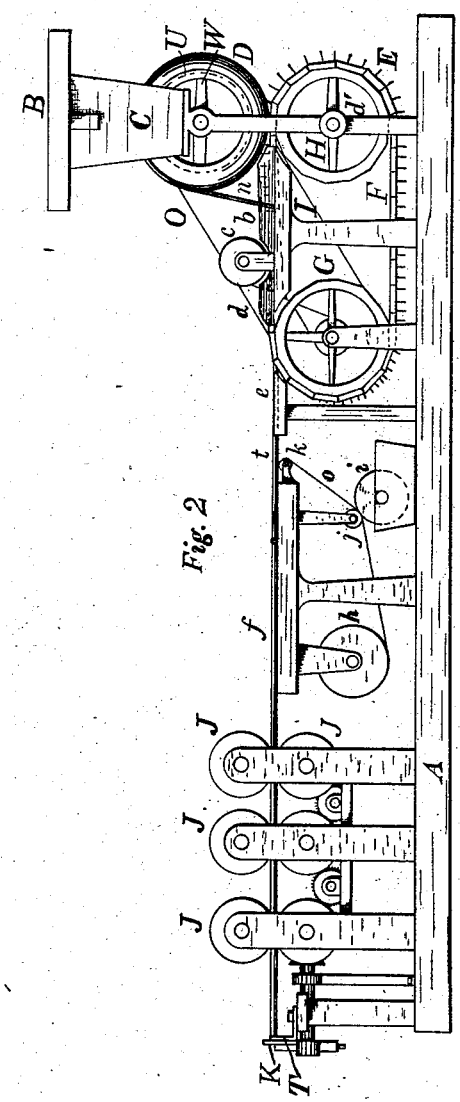

My improved cigarette-machine is represented in the accompanying drawings, in which Figure 1 is a plan view of my improved cigarette-machine. Fig. 2 is a side elevation of the same. Fig. 3 is a plan view of the paper-folder. Fig. 4 is an end view of the same. Fig. 5 is a side elevation of the tobacco-feeder, showing the opening in which the tobacco is fed into the feeder. Fig. 6 is a vertical section through the feeder. Fig. 7 is an end view of half of the feeder with tobacco-spout attached. Fig. 8 is a vertical section through the machine on the line 5 and 6, Fig. 1. Fig. 9 is the trimming-wheel. Fig. 10 is a scraper for scraping the tobacco from the teeth of the feeder. Fig. 10$^a$ is a section on the line $x\ x$, Fig. 10. Fig. 11 is an end view of the paper-folders detached. Fig. 12 is a plan view of a portion of the endless chain. Fig. 13 is a side elevation of the same. Fig. 14 represents one of the feeding-teeth in the endless chain. Fig. 15 is a section through 1 and 2, Fig. 1. Fig. 16 is a section through the rim of the wheel H and the lower portion of the feeder. Fig. 17 is the table upon which the endless chain slides. Fig. 18 is a side elevation of the same. Fig. 19 is a section through the same on the dotted line 3 and 4. Fig. 20 is an end view of the compressor. Fig. 21 is a side elevation of the same. Fig. 22 is a side elevation of the scraper. Fig. 23 is an end view of the same.

My improved cigarette-machine is shown in the accompanying drawings, in which—

A is the supporting-table, and B the feed-board.

C is a spout for conveying the tobacco into the feeder D, which consists of two revolving cups, with their inner edges studded with points for the purpose of distributing the tobacco on the teeth E of the endless chain F, which revolves around the wheels G and H, mounted on shafts in suitable bearings. I is a supporting-table, for the purpose of supporting the endless chain and forming the cigarette rod on between the wheels G and H.

$a$, Fig. 12, is a concave groove in the endless chain F, into which the tobacco is compressed.

$b$ is a guide for compressing the tobacco.

$c$ is a trimming-wheel, which runs in the groove $a$ for the purpose of shearing off any surplus tobacco.

$d$ is a compressor, for the purpose of compressing the tobacco in the groove $a$.

$e$ is a scraper, for the purpose of scraping the tobacco out of the groove $a$.

$f$ is a supporting-table for the purpose of supporting the cigarette rod.

$g$ and $g'$ are folding-fingers, for the purpose of folding the paper around the rod of tobacco.

J J J are drawing-rolls mounted in suitable bearings and geared in a suitable manner, as shown in Figs. 1 and 2, for the purpose of drawing the cigarette rod.

$h$, Fig. 2, is an endless roll of paper.

$i$ is a paste-roll.

$j$ is a small roll, mounted in suitable bearings and serving to press the web of paper against the paste-roll $i$.

$k$ is a small roll, mounted in suitable bearings, around which the paper passes.

$l$, Figs. 15, 17, and 19, and shown in dotted lines in Figs. 8 and 18, is a guide for the purpose of drawing the teeth E out of the groove $a$.

$m$, Figs. 17 and 19, is a groove in the table I, for the purpose of carrying the endless chain.

$n$ is a band around the feeder, to prevent the tobacco from flying out.

O is a belt connecting the feeders with the driving-shaft L.

P is a belt connecting the shaft L with the drawing-rolls.

P' is the main driving-belt.

$q\ q$, Fig. 6, are points on the inner edges of the feeder, for the purpose of carrying the tobacco around within the feeder and distributing it on the teeth E.

*r*, Fig. 10, is a scraper secured to the band *n* for the purpose of scraping the tobacco off the points *q q*.

*s*, Fig. 14, is a projection on each tooth E, said projections passing under the guide *l* for the purpose of withdrawing the teeth from the groove *a*.

T, Figs. 1 and 2, is a stationary shear-block, upon which the cigarette rod is divided by the knife K.

*t* represents the tobacco rod.

In the practical operation of my improved cigarette-machine, the tobacco is fed by hand from the feed-board B into the spout C, through which it descends into the revolving feeder D, which revolves in the direction indicated by the arrow in Fig. 8. The feeder D consists of a rotating chamber or receptacle, arranged to revolve on the shaft V, which is supported in journals on a suitable framing, *d'*, and which chamber may be either conical, cylindrical, or, as represented in the drawings, spherical, with flat ends. One of the ends of the feeder is open, (see Figs. 5 and 6,) except as it is crossed by the spokes W, for the purpose of permitting the passage of the tobacco into the chamber from the spout C. The open end is provided with a cover, U, Fig. 7, by which the escape of the tobacco from the feeder is prevented. The feeder is divided into two parts by a narrow circumferential opening, *v*, Fig. 6, into which the teeth E of the endless chain F project on the under side, as represented in Fig. 16. The edges of the feeder on each side of the opening *v* are provided with a row of pins or points, *q*, which project inward from the interior surface of the feeder on each side of the opening, and are inclined toward each other, as represented in the drawings, so that as the feeder revolves the points *q q* nearly touch the teeth E E. The opening *v* is closed except where the teeth E project into it by the band *n*, which is supported by bracing from the frame-work or the table I in any convenient manner. The band *n* has attached to it the scraper *r*, Figs. 8, 10, and 10ᵃ, which projects downward into the upper part of the feeder, and performs the office of scraping or detaching the tobacco from the points *q q*. The operation of the feeder in delivering the tobacco to the feeding-teeth E on the endless chain F will be understood from an examination of the sectional view, Fig. 8. The feeder is driven at a sufficient speed to give the tobacco therein a tendency to fly outward from the action of centrifugal force, and, as the feeder revolves, the tobacco is continually tossed about and commingled within the feeder, thereby insuring a regular delivery to the teeth E. The tobacco is stripped or detached from the points *q q* at the upper part of the feeder by the scraper *r* being thrown downward thereby.

The teeth E, projecting into the opening *v* and moving in a direction opposite to that in which the feeder revolves, pull a regular supply of tobacco out from the lower side of the feeder through the opening *v* and into the former *b*, by which the tobacco is shaped and compacted into a rod, which is inclosed in a paper tube, and cut into suitable lengths by the subsequent operation of the machine.

The wheels G and H, about which the endless chain F travels, are supported by suitable journals arising from the bed A, the wheel H being driven from G by the chain. Between the two wheels the chain F is supported by a table, I, which is provided on its upper side with a groove, *m*, in which the chain travels. The table I supports also the former *b*, the trimming-wheel *c*, and the compressor *d*. The former *b* consists of a curved plate of metal, largest at the end next the feeder, and tapering gradually toward the trimming-wheel. It is fastened to the table I in any convenient manner. The trimming-wheel *c* is a hardened-steel roller, having a groove about its periphery of a size corresponding to that of the compacted tobacco rod. It is supported on the table I by suitable journals. The trimming-wheel, the edges of which are sharp, projects downward into the groove *a* in the chain F, and it trims off any surplus tobacco from the rod. The compressor *d*, the form of which is shown in the detached views, Figs. 20 and 21, projects downward into the groove *a* in the chain, and serves by pressure to compact the tobacco rod after it has passed the trimming-wheel. The compressor is provided with wings by which it is affixed to the table I.

The endless chain F consists of a series of links connected together at their ends by screws or pivots, and adapted to travel around the wheels G and H in suitable grooves formed in their peripheries. The links are provided with a groove, *a*, in which the tobacco rod is formed. The links are perforated with holes in the middle of the groove *a*, through which the movable feeding-teeth E pass. The teeth are preferably formed of bent pieces of wire, which are pivoted to the sides of the links at *e' e'*, Fig. 13, on pins or screws inserted into the links. The wire forming the teeth extends along the sides of the links, is then bent inward under the links, and passes upward through the openings, so as to project for a short distance above the links. At *s*, Figs. 13 and 14, the wire is bent on itself sharply, so as to form a lug or projection which engages with the inclined guide *l*, which projects inward from the side of the groove in the table I, and operates to control the position of the teeth relatively to the upper side of the links. As the teeth traveling with the chain F pass through the opening *v* about the periphery of the feeder D, they carry the tobacco with them into the former *b*; but it is necessary they should be withdrawn from the tobacco rod as the latter passes away from the feeder. This operation is effected by the inclined guide *l*, which draws the teeth E downward as they pass by it into the position represented by the dotted lines E', Fig. 13, when their ends are free from the tobacco, having moved down to or below the bottom of the groove a in the links. The operation will be readily understood from the sectional view, Fig. 15.

In the drawings I have represented that part of the feeding-teeth E which passes through the chain as slightly bent on a circle having its center of curvature at or near the pivotal point e' of the teeth; but it is obvious that the teeth may be made straight if the openings in the chain are slotted for this purpose; or, if the teeth be arranged to move radially in and out, like the action of the sliding rods of my former patent, No 231,947, the groove in the wheel H is so formed as to press the teeth out through the chain, and, after being engaged with the tobacco, the teeth will remain therein without any tendency to drop downward, although, if necessary, the guide l may be made double, the lugs s passing through between the upper and lower portions thereof, for the purpose of positively preventing the teeth from falling down out of the tobacco. As the teeth arrive near X, on the lower side of the wheel G, they fall downward, from their own weight, and project outward from the chain. Only the points of the teeth E are represented in Fig. 8.

The formed tobacco rod is removed from the groove a in the chain by means of the scraper e, Fig. 8, which is supported from the bed A by a suitable arm. Provision may be made for adjusting the position of the scraper relatively to the chain in any suitable manner. The form of the scraper is represented in the detached views, Figs. 22 and 23. It is provided with a groove on its upper side, through which the formed tobacco rod passes. After the scraper, the tobacco rod next passes over the table f, on which it is supported while the web of paper is folded about it. The paper web, which is coiled on the drum h, Fig. 2, passes around the roller j, one of its edges being covered with paste by the paste-roll i at this point, and thence around the roller k, whence it passes onward in the same direction in which the tobacco rod t is traveling, being folded about the said rod as it moves over the table f by the operation of the folders g and g', Fig. 3. Detached views of the folders are given in Figs. 4 and 11, from which and Fig. 3 their action in folding the paper about the tobacco will be readily perceived. The operation of folding the paper web about the tobacco rod is very much facilitated by placing the folders at some little distance apart on opposite sides of the rod—say, from one to two inches; but this arrangement necessitates the support of the rod between the folders and preferably for some short distance in front of the first folder. For this purpose I use the table or support f, which sustains the rod at and between the folders. After the fold is completed by the second folder, g', and the pasted edges of the web caused to adhere, the cigarette rod will support itself. From the supporting-table f the cigarette rod passes between the rollers J J, which draw it onward and deliver it to the knife K, to be severed into suitable lengths. These rollers are provided with grooves of a suitable size to feed the cigarette rod, and they are supported from the bed-plate A by suitable framing, being geared together to run at the proper speed, and driven from the main driving-shaft L by the belt P, Fig. 1. The knife K revolves with the shaft Y, being driven from the shaft of one of the rollers J by the bevel-gear Z at a suitable speed to cut off cigarettes from the cigarette rod of the proper length. The knife K divides the cigarette rod at each revolution against the stationary shear-block, T.

The band n encircles the feeder D at a slight distance therefrom, so as to prevent the escape of any tobacco through the opening V, without producing unnecessary friction on the exterior of the feeder. The band n is slotted at its lower part to permit the passage of the feeding-teeth E, as represented in the drawings, Figs. 6 and 16.

The groove about the wheel H, in which the chain travels, is shaped so as to press the teeth E outward, while the groove in the wheel G is of a form which permits the teeth to pass around the wheel when their points are withdrawn below the bottom of the groove a.

I do not claim herein anything which has been previously patented to me.

I claim—

1. The combination, in a cigarette-machine, of the rotating feeder D, provided with peripheral opening v, and internal points, q q, of the traveling retractile feeding-teeth E, and suitable mechanism for causing the protrusion of the teeth while passing through the opening in the feeder, and for subsequently retracting the same, substantially as described.

2. The combination, with the traveling grooved chain F, of the retractile feeding-teeth E, pivoted to the chain and having their free ends arranged to move in suitable openings therein, substantially as described.

3. The combination, with the traveling grooved chain F, of the retractile feeding-teeth E, pivoted to the chain and provided with lugs s, and a suitable guide, l, arranged to retract the teeth as they pass by it, substantially as described.

4. The combination, with the rotating feeder D, provided with the peripheral opening v, and a series of inwardly-projecting points, q q, on each side of the opening inclined toward each other, as described, and the traveling teeth E, substantially as and for the purposes set forth.

5. The combination, with the revolving feeder D, arranged to be fed at one side through the spout C, and having peripheral opening v and a double series of inwardly-projecting points, q q, of the band n, having an opening at the lower side of the feeder, and the scraper *r* at the upper side of the feeder, substantially as and for the purposes set forth.

6. The combination, with the revolving feeder D, provided with the peripheral opening *v*, and a series of inwardly-projecting points, *q q*, of the spout C, arranged to deliver the tobacco to the feeder through the open end thereof, and the cover U, substantially as and for the purposes set forth.

7. The combination of the rotating feeder D with the traveling retractile feeding-teeth E, substantially as described.

8. The combination of the rotating feeder D, provided with peripheral opening *v*, and internal points, *q q*, of the traveling retractile feeding-teeth E, substantially as described.

9. The combination of the rotating feeder D, endless chain F, provided with movable teeth E, guide *l*, and former *b*, substantially as described.

10. In a cigarette-machine, the endless traveling feeding-chain F, provided with the retractile teeth E, passing through the chain in the groove *a*, substantially as described.

11. The combination, with the wheels G and H, of the endless traveling grooved chain F, provided with the retractile feeding-teeth E, and the guide *l*, substantially as and for the purposes set forth.

12. The combination of the endless traveling grooved chain F, provided with the retractile feeding teeth E, with the guide *l* and scraper *c*, substantially as and for the purposes set forth.

13. The combination of the rotating feeder D, provided with peripheral opening *v*, and the internal points, *q q*, scraper *r*, projecting inward from the upper part of the feeder, a series of traveling retractile feeding-teeth E, and suitable mechanism for operating the teeth, substantially as described.

14. The combination, in a cigarette-machine, of a revolving feeding device provided with a peripheral opening arranged to distribute the tobacco by centrifugal force upon a series of retractile teeth attached to a suitable traveling support and projecting into the opening in the feeding device, a suitable device for forming the tobacco on the teeth into a rod, and mechanism for withdrawing the teeth from the rod, substantially as described.

OSCAR W. ALLISON.

Witnesses:
GEO. B. SELDEN,
H. G. PHILLIPS.